(12) United States Patent
Refaat et al.

(10) Patent No.: US 11,873,011 B2
(45) Date of Patent: Jan. 16, 2024

(54) LABELING LANE SEGMENTS FOR BEHAVIOR PREDICTION FOR AGENTS IN AN ENVIRONMENT

(71) Applicant: Waymo LLC, Mountain View, CA (US)

(72) Inventors: Khaled Refaat, Mountain View, CA (US); Kai Ding, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 508 days.

(21) Appl. No.: 17/083,988

(22) Filed: Oct. 29, 2020

(65) Prior Publication Data

US 2022/0135078 A1 May 5, 2022

(51) Int. Cl.
*B60W 60/00* (2020.01)
*B60W 40/04* (2006.01)
*G06N 20/00* (2019.01)

(52) U.S. Cl.
CPC ........ *B60W 60/0027* (2020.02); *B60W 40/04* (2013.01); *G06N 20/00* (2019.01)

(58) Field of Classification Search
CPC ... B60W 60/0027; B60W 40/04; G06N 20/00
See application file for complete search history.

(56) References Cited

U.S. PATENT DOCUMENTS

| | | | |
|---|---|---|---|
| 11,080,537 B2 * | 8/2021 | Bai | G06N 3/08 |
| 2019/0025841 A1 * | 1/2019 | Haynes | G05D 1/0214 |
| 2020/0133280 A1 * | 4/2020 | Seccamonte | B60W 60/0013 |
| 2022/0089153 A1 * | 3/2022 | Gyllenhammar | B60W 40/04 |

OTHER PUBLICATIONS

Augustin et al., "Prediction of highway lane changes based on prototype trajectories," Forsch Ingenieurwes, Jul. 2019, 83:149-161.
Mahajan et al., "Prediction of Lane-Changing Maneuvers with Automatic Labeling and Deep Learning," Transportation Research Record, 2020, 2674(7);336-347.
Scheel et al., "Attention-based Lane Change Prediction," International Conference on Robotics and Automation, Mar. 2019, 7 pages.
Yao et al., "Learning Lane Change Trajectories From On-road Driving Data," 2012 Intelligent Vehicles Symposium, Jun. 2012, pp. 885-890.

* cited by examiner

*Primary Examiner* — Peter D Nolan
*Assistant Examiner* — Anwar Mohamed
(74) *Attorney, Agent, or Firm* — Fish & Richardson P.C.

(57) ABSTRACT

Methods, systems, and apparatus, including computer programs encoded on a computer storage medium, for generating candidate future trajectories for agents. One of the methods includes obtaining scene data characterizing a scene in an environment at a current time point; for each of a plurality of lane segments, processing a model input comprising (i) features of the lane segment and (ii) features of the target agent using a machine learning model that is configured to process the model input to generate a respective score for the lane segment that represents a likelihood that the lane segment will be a first lane segment traversed by the target agent after the current time point; selecting, as a set of seed lane segments, a proper subset of the plurality of lane segments based on the respective scores; and generating a plurality of candidate future trajectories for the target agent.

16 Claims, 9 Drawing Sheets

LABELING LANE SEGMENTS FOR BEHAVIOR PREDICTION FOR AGENTS IN AN ENVIRONMENT

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs on one or more computers in one or more locations that generates behavior prediction data for agents in the vicinity of an autonomous vehicle. More specifically, this specification describes a system that generates candidate future trajectories for a given target agent by more effectively identifying a seed set of initial lane segments that serve as the basis for the generated candidate future trajectories using a machine learning model. This specification also describes a system that trains the machine learning model by automatically identifying ground truth initial lane segments using ground truth trajectories.

Particular embodiments of the subject matter described in this specification can be implemented so as to realize one or more of the following advantages.

Behavior prediction systems predict future trajectories for vehicles and other agents in the vicinity of an autonomous vehicle. In particular, some of these behavior prediction systems receive as input candidate future trajectories for a target agent and generate as output a respective score for each candidate future trajectory. These predictions can then be used to make and update driving decisions for the autonomous vehicle. Thus, the usefulness of the behavior predictions made by the behavior prediction systems to the autonomous driving of the vehicle can be improved by improving the candidate future trajectories that are provided as input to the behavior prediction system, i.e., by improving the relevance of the input candidate future trajectories to the actual future trajectory of the agent.

Some existing systems generate each input candidate future trajectory from a corresponding sequence of lane segments on the roadway in the vicinity of the target agent that could be consecutively traversed by the target agent. A set of sequences of lane segments ("path hypotheses") can be generated by first identifying a set of seed lane segments and then generating a set of path hypotheses that each start at one of the set of seed lane segments.

One way to find the set of seed lane segments is to search in the vicinity of the agent for possible starting lanes for the agent to take. For example, heuristics, such as the Euclidean distance from the lane, the heading angle of the vehicle compared to the angle of the lane, and so on, can be used to pick a set of plausible lanes to start from.

However, this approach can be error prone. For instance, in some situations, the agent is not perfectly following any given lane or may be in the process of a maneuver to take a lane far away from the current position of the target agent, e.g., making a U-turn to take a lane on the opposite side of the roadway or changing lanes to a lane that is far away from the current position of the target agent.

Moreover, the on-board system cannot generate a large number of trajectories to be evaluated by the behavior prediction system due to computational limits on-board the vehicle, i.e., due to strict latency requirements required for timely autonomous driving decisions to be made and due to limited computational resources being available on-board the vehicle. Thus, it is not feasible to address these issues simply by using all of the lane segments within a larger radius as seed lane segments.

By using the described techniques, however, the on-board system can limit the number of trajectories that are generated to satisfy the computational requirements by limiting the number of plausible lanes that the target agent can start from while still ensuring that highly relevant candidate trajectories are generated.

In particular, the described techniques use machine learning to train a model from automatically generated data to predict a likelihood, e.g., a probability, of a given lane segment being taken by the target agent. Once trained, the machine learning model can be used to rank the lane segments, and the on-board system can select only the highest ranked lanes to use for generating path hypotheses, and accordingly trajectories. This approach results in highly relevant candidate trajectories being provided to the behavior prediction system while limiting the total number of candidate trajectories that need to be considered by the behavior prediction system to satisfy the computational requirements on-board the vehicle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an on-board system of an autonomous vehicle can generate candidate future trajectories for a target agent in the vicinity of the autonomous vehicle. The target agent can be, for example, a bicyclist or another vehicle. Once generated, the on-board system causes a behavior prediction system to generate behavior prediction data that scores the generated candidate future trajectories, i.e., in terms of how likely each candidate future trajectory is to be the actual future trajectory of the target agent.

In particular, the on-board system can generate the candidate trajectories by selecting a set of candidate initial lane segments using a machine learning model. The on-board system then uses the candidate initial lane segments to generate path hypotheses that are each made up of a sequence of lane segments and then generates a respective candidate future trajectory for each path hypothesis.

A lane segment, as used in this specification, is a portion of a lane on a roadway. Generally, a lane is a division of a road way along the direction of travel along the roadway. Examples of lanes include driving lanes and bike lanes. More specifically, a lane is a potentially curved portion of the roadway that guides vehicles to move safely around other vehicles occupying other neighboring and overlapping lanes. A lane segment is any continuous segment of a lane. For example, a lane continuing for 100 meters can have a lane segment beginning at the lane start and ending after traveling 10 meters on that lane Whenever there is a decision to be taken when travelling along a lane (e.g., turn left or continue straight), it can be assumed that the lane ends and multiple lanes corresponding to the different decisions continue from where the lane ended.

The on-board system can use the behavior prediction data to perform actions, i.e., to control the vehicle, which causes the vehicle to operate more safely. For example, the on-board system can generate fully-autonomous control outputs to apply the brakes of the vehicle to avoid a collision with a merging vehicle if the behavior prediction data suggests the merging vehicle is unlikely to yield.

These features and other features are described in more detail below.

Figure 1:
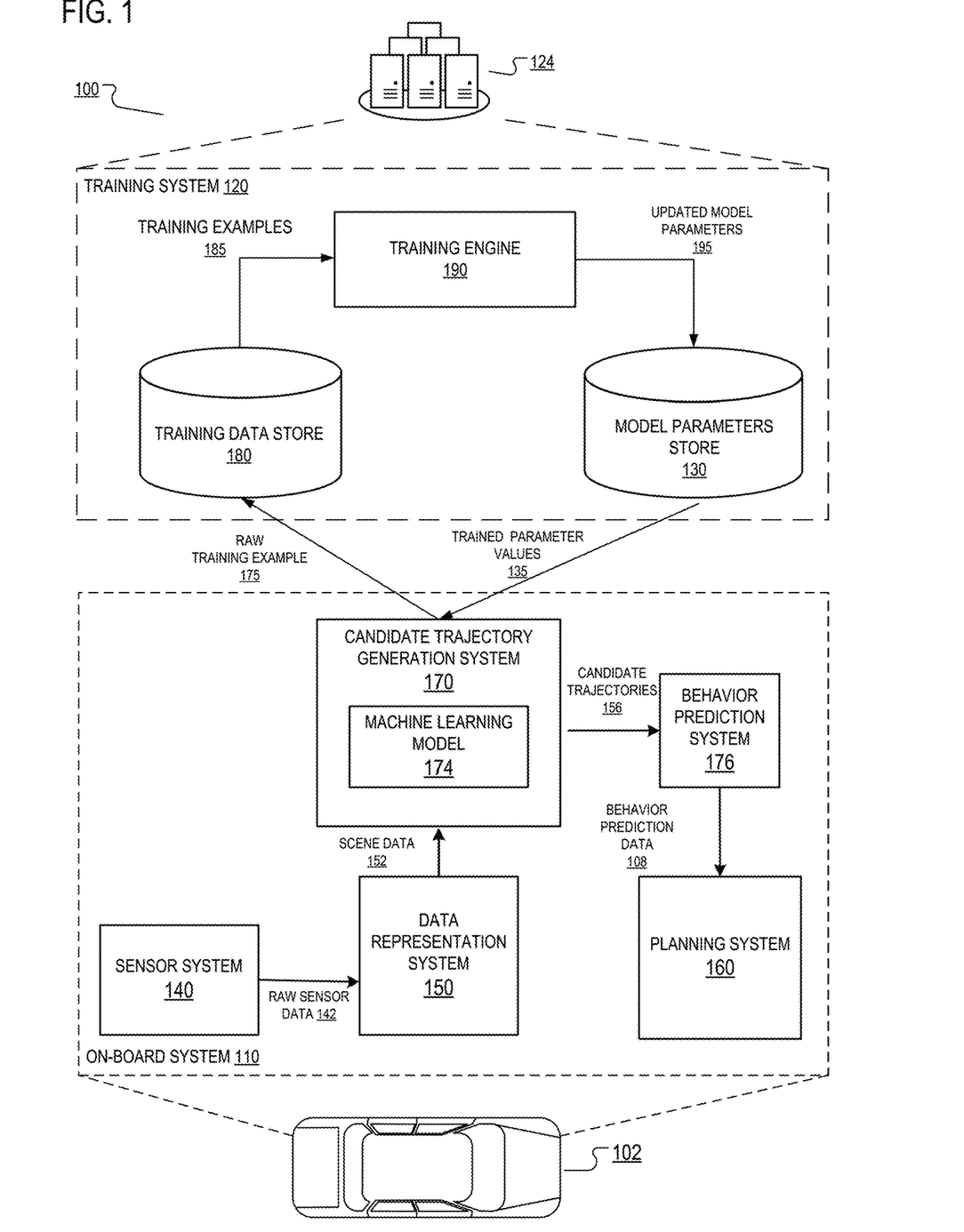
FIG. 1 is a block diagram of an example on-board system.

FIG. 1 is a block diagram of an example on-board system 100. The on-board system 100 is composed of hardware and software components, some or all of which are physically located on-board a vehicle 102. In some cases, the on-board system 100 can make fully-autonomous or partly-autonomous driving decisions (i.e., driving decisions taken independently of the driver of the vehicle 102), present information to the driver of the vehicle 102 to assist the driver in operating the vehicle safely, or both. For example, in response to determining that another vehicle is unlikely to yield for the vehicle 102, the on-board system 100 may autonomously apply the brakes of the vehicle 102 or otherwise autonomously change the trajectory of the vehicle 102 to prevent a collision between the vehicle 102 and the other vehicle.

Although the vehicle 102 in FIG. 1 is depicted as an automobile, and the examples in this document are described with reference to automobiles, in general the vehicle 102 can be any kind of vehicle. For example, besides an automobile, the vehicle 102 can be another kind of autonomous vehicle that travels along a roadway, e.g., a truck or a motorcycle. Moreover, the on-board system 100 can include components additional to those depicted in FIG. 1 (e.g., a collision detection system or a navigation system).

The on-board system 100 includes a sensor system 104 which enables the on-board system 100 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

The sensor system 104 continually (i.e., at each of multiple time points) captures raw sensor data which can indicate the directions, intensities, and distances travelled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle. The on-board system 110 includes one or more sensor subsystems 140. The sensor subsystems 140 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 140 or other components of the vehicle 102 can also classify groups of one or more raw sensor measurements from one or more sensors as being measures of another agent in the environment. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 140 classify one or more groups of raw sensor measurements as being measures of respective other agents, the sensor subsystems 140 can compile the raw sensor measurements into a set of raw data 142, and send the raw data 142 to a data representation system 150.

The data representation system 150, also on-board the vehicle 102, receives the raw sensor data 142 from the sensor system 140 and additional data that characterizes the environment, i.e., roadgraph data that identifies lanes within roadways in the environment and generates scene data 152 that includes features that characterize the agents and environment in the vicinity of the vehicle 102.

The data representation system 150 provides the scene data 152 to a candidate trajectory generation system 170, also on-board the vehicle 102.

For each of a set of target agents that have been identified in the environment, the candidate trajectory generation system 170 uses the scene data 152 to generate a set of candidate future trajectories 156 for the target agent. Each candidate future trajectory for a target agent is a possible trajectory that the target agent could follow in the immediate future, e.g., for the next five or ten seconds after the current time point, given the roadways in the vicinity of the agent and features of the target agent. More specifically, each candidate future trajectory identifies, for each of multiple future times, the geometry of the agent at the future time, e.g., the position and optionally the heading of the agent, and the velocity of the agent at the future time.

A behavior prediction system 176 on-board the vehicle receives the candidate future trajectories 156 for each target agent and scores the trajectories to generate behavior prediction data 108 that assigns a score to each of the candidate future trajectories 156. In particular, the behavior prediction system 176 assigns to each candidate future trajectory 156 a respective score that represents the likelihood that the target agent will follow the candidate future trajectory 156 starting at the current time point.

Thus, because the behavior prediction system 176 operates on existing candidate trajectories 156, the performance of the behavior prediction system 176 is dependent on the quality of the candidate trajectories that are provided as input to the system 176.

The on-board system 100 can continually generate behavior prediction data 108 for agents in the vicinity of the vehicle 102, for example, at regular intervals of time (e.g., every 0.1 seconds).

The on-board system 100 can provide the behavior prediction data 108 to a planning system 160.

When the planning system 116 receives the behavior prediction data 108, the planning system 160 can use the behavior prediction data 108 to make fully-autonomous driving decisions, i.e., to update a planned trajectory for the vehicle 102. For example, the planning system 160 can generate a fully-autonomous plan to navigate the vehicle 102 to avoid a collision with another agent by changing the future trajectory of the vehicle 102 to avoid the agent. In a particular example, the on-board system 100 may provide the planning system 160 with data indicating that another vehicle which is attempting to merge onto a roadway being travelled by the vehicle 102 is unlikely to yield to the vehicle 102. In this example, the planning system 160 can generate fully-autonomous control outputs to apply the brakes of the vehicle 102 to avoid a collision with the merging vehicle.

The fully-autonomous driving decisions generated by the planning system 160 can be implemented by a control system of the vehicle 102. For example, in response to receiving a fully-autonomous driving decision generated by the planning system 160 which indicates that the brakes of the vehicle should be applied, the control system may transmit an electronic signal to a braking control unit of the vehicle. In response to receiving the electronic signal, the braking control unit can mechanically apply the brakes of the vehicle.

Thus, because the behavior prediction data 108 is used by the planning system 160 to plan the driving of the vehicle 102, generating improved candidate trajectories 156 can result in improved performance of the vehicle 102.

To allow the candidate trajectory generation system 170 to generate high quality candidate trajectories 156, the system 170 makes use of a machine learning model 174 that has parameters ("model parameters") and that is configured to receive a model input that includes features of a target agent, features of a lane segment of a roadway, and optionally other information and to process the model input in accordance with the model parameters to generate as output a score for the lane segment that represents the likelihood that the lane segment will be the first (or initial) lane segment traversed by the target agent after the current time point.

The machine learning model 174 can be any appropriate type of machine learning model that can map a set of features to a score. As one example, the machine learning model 174 can be a neural network, e.g., a multi-layer perceptron, that has an output layer with a single node, e.g., a sigmoid output layer, that generates the score. As another example, the machine learning model 174 can be a support vector machine. As yet another example, the machine learning model 174 can be a decision forest.

More specifically, for each target agent in the environment, the candidate trajectory generation system 170 can identify an initial set of candidate lane segments, score each candidate lane segment using the model 174, and then select a proper subset of the initial set as the set of initial (or seed) lane segments for the target agent. The system 170 then generates the candidate trajectories 156 for the target agent starting from the initial set of lane segments. Generating candidate trajectories is described in more detail below with reference to FIG. 2.

By using the machine learning model 174 rather than, e.g., a heuristic-based approach, to select the set of initial lane segments for the target agent, the system 170 can generate candidate trajectories 156 that more accurately represent the set of plausible future trajectories of the target agent.

To generate the candidate trajectories 156, the system 170 can use trained parameter values 135 for the machine learning model 174 that it obtains from a model parameters store 130 in the training system 120.

The training system 120 is typically hosted within a data center 124, which can be a distributed computing system having hundreds or thousands of computers in one or more locations.

The training system 120 includes a training data store 180 that stores the training data used to train the parameter values of the machine learning model 174. The training data store 180 receives raw training examples from vehicles operating in the real world. For example the training data store 180 can receive a raw training example 175 from the vehicle 102 and one or more other agents that are in communication with the training system 120. The raw training example 175 can be processed by the training system 120 to generate a new training example. The raw training example 175 includes a model input for the machine learning model 174. The raw training example 175 also includes outcome data characterizing the actual trajectory traversed by the target agent that is the subject of the model input. This outcome data can be used to generate a training example and to label the training engine as either a positive training example or a negative training example. Generating training examples will be described in more detail below with reference to FIGS. 3 and 4A-F.

The training data store 180 provides training examples 185 to a training engine 190, also housed in the training system 120. The training engine uses the training examples 185 to update the model parameters of the machine learning model 174, and provides the updated model parameters 195 to the model parameters store 130. Once the parameter values of the model 174 have been fully trained, the training system 120 can send the trained parameter values 135 to the on-board system 110, e.g., through a wired or wireless connection.

Figure 2:
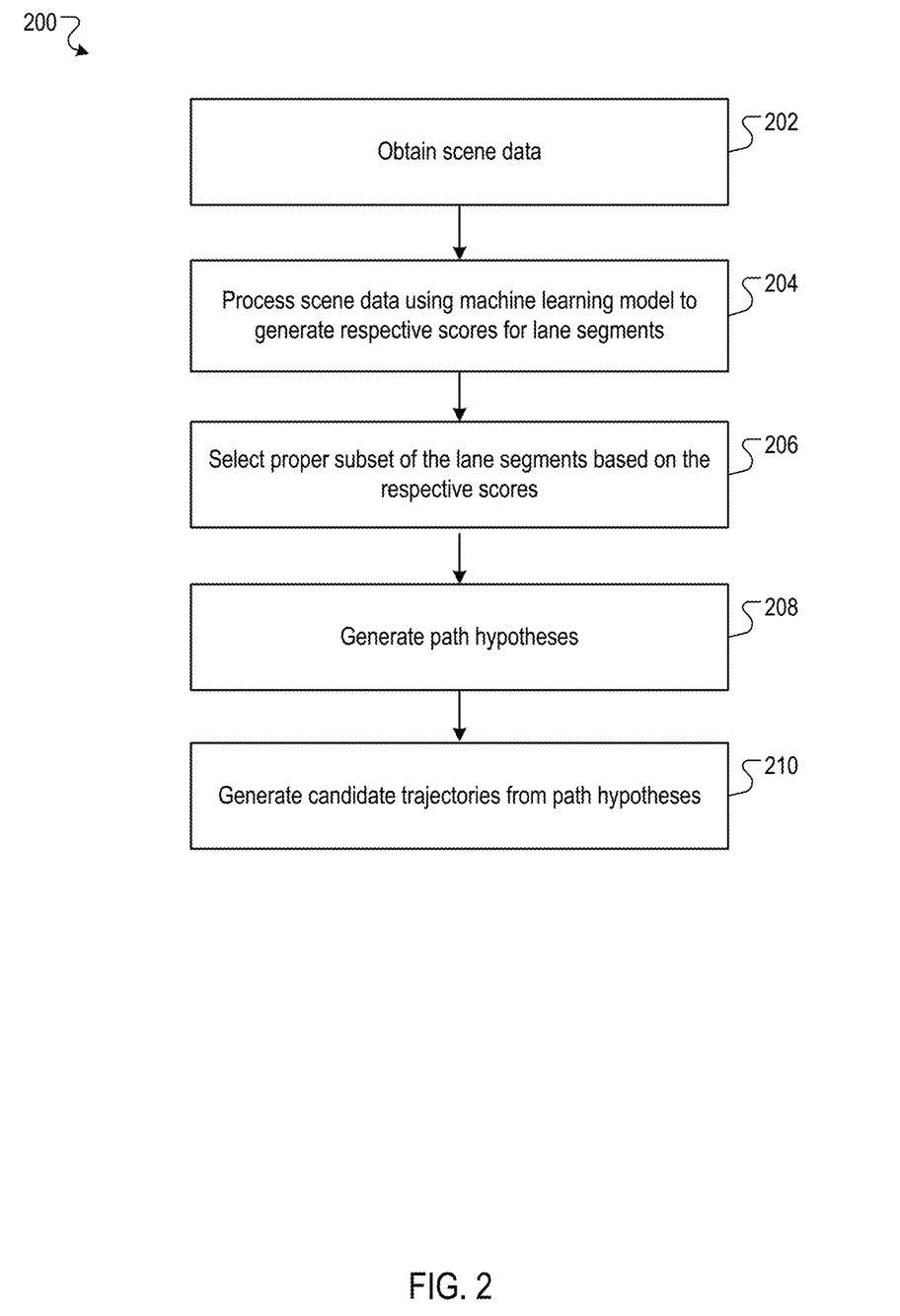
FIG. 2 is a flow diagram of an example process for generating candidate trajectories.

FIG. 2 is a flow diagram of an example process 200 for generating candidate future trajectories for a target agent. For convenience, the process 200 will be described as being performed by a system of one or more computers located in one or more locations. For example, an on-board system, e.g., the on-board system 100 of FIG. 1, appropriately programmed in accordance with this specification, can perform the process 200.

The system obtains scene data characterizing a scene in an environment at a current time point (202). The scene in the environment includes an autonomous vehicle navigating through the environment and one or more other agents including the target agent. The target agent can be, for example, another vehicle, a cyclist, a pedestrian, or any other dynamic object in the environment whose future trajectory may impact driving decisions for the autonomous vehicle.

The scene data generally includes feature data characterizing the target agent and feature data characterizing lane segments of one or more lanes on one or more roadways in the vicinity of the target agent in the environment.

For example, the feature data characterizing the target agent can include any of the following: agent type (vehicle, cyclist), agent speed, agent heading, agent acceleration, motion curvature of the agent's current trajectory, history of positions along the agent's current trajectory, history of speed, history of heading, and so on.

For example, the feature data characterizing the lane segment can include any of the following: heading of the lane segment at the point closest to the target agent, curvature of the lane segment at the point closest to the target agent, whether the segment is part of an exit lane and if so, the type of exit lane (e.g., whether the exit lane is a left turn), whether the segment is part of an entrylane and if so the type of entry lane, speed limit of the lane segment, and so on.

The feature data can also include features that are based on a comparison between the target agent and the lane segment. Examples of such features include the difference between the agent's orientation and the heading of the closest point on the lane, the distance between the agent and the closest point on the lane, and so on.

The scene data can optionally also include other information, e.g., features of other agents in the environment or information about the current state of the environment, e.g., current traffic light states.

The system processes the scene data using a machine learning model to generate a respective score for each lane segment in a set of lane segments (step 204). The score for a given lane segment represents the likelihood, e.g., the probability, that the lane segment will be the first lane segment traversed by the target agent after the current time point.

The system can select, as the lane segments in the set of lane segments, each lane segment that is within a fixed radius of the target agent. Because not all of the lane segments in the set of lane segments will be used to generate candidate future trajectories, the system can use a larger radius and accordingly, consider a larger set of lane segments, without a significant negative impact on the latency of performing the process 200.

In particular, the machine learning model can be configured to, for a given lane segment, process a model input that includes (i) features of the target agent, (ii) features of the lane segment, and, optionally, (iii) the other information in the scene data to generate a score, e.g., a probability, for the given lane segment that represents the likelihood that the given lane segment will be the first lane segment traversed by the target agent after the current time point.

Training the machine learning model to generate accurate scores for lane segments, i.e., scores that accurately reflect the actual likelihood that the agent will begin traversing any given lane segment after the current time point, is described in more detail below with reference to FIGS. 3 and 4A-F.

The system selects a proper subset of the lane segments based on the respective scores for the lane segments (step 206). For example, the system can select a fixed number of lane segments that have the highest scores or select each lane segment that has a score that exceeds a threshold.

The system generates, for each lane segment in the proper subset, one or more path hypotheses that each start at the lane segment (step 208).

Each path hypothesis is a sequence of lane segments that starts at the corresponding initial lane segment. At the end of each lane segment in the sequence, the path hypothesis either continues on to the next lane segment in the same lane or transitions to a lane segment in another lane.

As one example, the system can maintain validity data specifying, for each given lane segment in the vicinity of the vehicle, a set of valid lane segments. A valid lane segment for a given lane segment is one that an agent travelling along the given lane segment can transition onto.

As a particular example, the system can maintain data representing a directed graph that has nodes that represent lane segments and edges that represent valid transitions between the corresponding lane segments. In other words, the agent can only transition from lane segment A to lane segment B if the node representing lane segment A is connected by an outgoing edge to the node representing lane segment B in the directed graph.

The system can then select, as the path hypotheses for a given initial lane segment, all possible paths that (i) include a number of lane segments that is at less than or equal to a maximum number of segments, (ii) start with the given initial lane segment, and (iii) in which each lane segment is immediately followed by a valid lane segment according to the validity data. In other words, each path hypothesis for the given initial lane segment can be a path in the directed graph that has no more than a maximum length and that starts at the node representing the given initial lane segment. A path hypothesis may be shorter than the maximum length if, for example, the path hypothesis ends in a dead end that has no exit lanes.

The system generates, for each path hypothesis, a corresponding candidate future trajectory (210). Unlike a path hypothesis that represents the future motion of the target agent in terms of fixed lane segments, a future trajectory specifies the actual geometry, i.e., spatial position in the environment and, optionally, heading, and speed of the agent at multiple future time points. That is, a path hypothesis represents the future motion of the agent along lane segments that are at fixed positions on the roadway. The candidate future trajectory for a given path hypothesis, on the other hand, represents the actual, realistic motion of an agent that intends to travel along all of the lane segments in the path hypothesis in the order specified by the path hypothesis, i.e., without constraining the target agent to travel along the fixed positions of the lane segments. Additionally, while a path hypothesis is a fixed set of lane segments, trajectories depend on the initial agent state as well: e.g., its position, speed, acceleration, heading, motion curvature will determine the trajectory geometry and speed at different trajectory points. The initial agent state imposes physical constraints that may force the trajectory to look different from the path hypothesis.

The system can generate a candidate future trajectory from a path hypothesis using any of a variety of conventional motion planning techniques. Examples of motion planning techniques that can be used include pure pursuit algorithms for path tracking, recurrent models trained using supervised learning, non-linear optimization techniques, iLQR trajectory optimization, and so on.

Once generated, the system can provide the candidate future trajectories to the behavior prediction system of the autonomous vehicle. The behavior prediction system can score the candidate trajectories, e.g., to determine how likely it is that the target agent will follow any of the candidate future trajectories, and the planning system of the autonomous vehicle can determine a planned future trajectory for the autonomous vehicle based in part on the scores generated by the behavior prediction system. That is, the planning system can plan the future motion of the autonomous vehicle based on the likely future motion of the agents in the vicinity of the vehicle in the environment.

Figure 3:
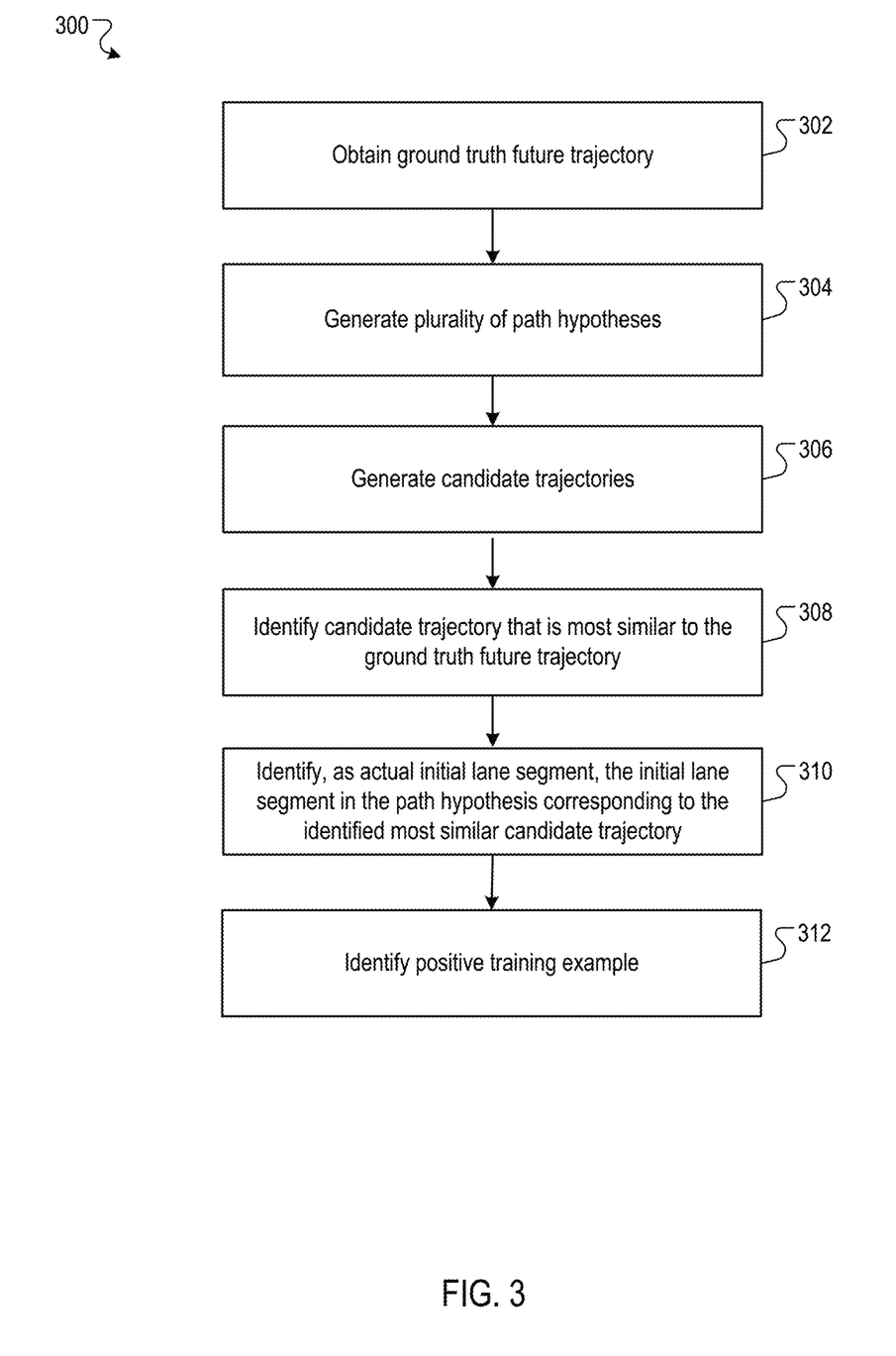
FIG. 3 is a flow diagram of an example process for generating training data for the machine learning model.

FIG. 3 is a flow diagram of an example process 300 for generating training data for training the machine learning model. For convenience, the process 300 will be described as being performed by a system of one or more computers located in one or more locations. For example, an on-board system, e.g., the on-board system 100 of FIG. 1, appropriately programmed in accordance with this specification, can perform the process 300.

The system can repeatedly perform the process 300 to generate training data that includes positive training examples and negative training examples.

A positive training example is a training example that includes a model input that includes (i) agent features of a target agent and (ii) lane segment features of a given lane segment and that is associated with a ground truth score, e.g., one, that indicates that the given lane segment was the actual initial lane segment for the future motion of the target agent.

A negative training example is a training example that includes a model input that includes (i) agent features of a target agent and (ii) lane segment features of a given lane segment and that is associated with a ground truth score, e.g., zero, that indicates that the given lane segment was not the actual initial lane segment for the future motion of the target agent, i.e., that the first lane segment traversed by the future motion of the target agent was a different lane segment.

The system can then train the machine learning model on the training data using conventional machine learning techniques, e.g., to optimize an objective function that measures the error between the score predicted by the machine learning model for a model input and the ground truth score for the model input. As a particular example, the system can train the machine learning model on the training data to minimize a binary cross-entropy loss function.

The system obtains data identifying a ground truth future trajectory of a target agent starting from the current position of the target agent at a current time point (step 302). That is, the system obtains data identifying the actual future trajectory that the target agent followed after the current time point corresponding to the training example.

The system generates a plurality of path hypotheses that each start at a respective initial lane segment in the vicinity of the current position of the target agent (step 304).

In particular, to generate the path hypotheses, the system first identifies a plurality of candidate initial lane segments and then generates, for each candidate initial lane segment, one or more respective path hypotheses that begin with the candidate initial lane segment. For example, once the candidate initial lane segments have been identified, the system can generate the path hypotheses as described above with reference to step 208 of FIG. 2.

The system can use any of a variety of techniques to identify the plurality of candidate initial lane segments during training.

For example, the system can identify the candidate initial lane segments based on heuristics that characterize the difference in positions between the lane segment and the target agent, e.g., based on the distance of the lane segments from the current position of the target agent. As a particular example, the system can identify, as a candidate initial lane segment, each lane segment that is (at least partially) within a threshold radius of the current position of the target agent.

As another example, the system can generate the training data using a bootstrapping technique. In bootstrapping, the system first trains one version of a model to generate a trained model and uses the trained model to generate refined training data, and then trains another version of the model on the refined training data. Optionally, the system can continue refining the training data and re-training the model until some termination criteria are satisfied. When the system is using bootstrapping, the system can identify the candidate initial lane segments by performing steps 204 and 206 using the current version of the machine learning model, i.e., use the current version of the machine learning model to select candidate initial lane segments.

The system generates a respective candidate future trajectory of the target agent corresponding to each of the plurality of path hypotheses (step 306). In particular, the system can generate the candidate future trajectories using motion planning techniques as described above with reference to FIG. 2.

The system identifies the candidate future trajectory that is most similar to the ground truth future trajectory of the target agent (step 308).

In particular, in some implementations the system computes a respective similarity measure between each candidate future trajectory and the ground truth future trajectory and then selects the candidate future trajectory that is most similar to the ground truth trajectory according to the similarity measures. The system can use any appropriate similarity measure that measures differences between trajectories. Examples of such similarity measures include pairwise Euclidean distance, dynamic time warping, Frechet distance, and so on.

In some other implementations, the system can provide, for presentation in a user interface on a user device, data identifying the candidate future trajectories and the ground truth future trajectory, and then receive a user input identifying which candidate future trajectory is the most similar to the ground truth trajectory.

The system identifies, as the actual initial lane segment for the future motion of the target agent, the initial lane segment of the path hypothesis that corresponds to the most similar candidate future trajectory (step 310). Thus, the system uses similarity between trajectories to identify the actual initial lane segment without needing a user to directly label the path hypotheses.

The system identifies, as a positive training example, the training example that includes a motion input that includes (i) agent features of a target agent and (ii) lane segment features the identified lane segment (step 312).

Optionally, the system can also identify, as initial lane segments that were not traversed by the target agent, each lane segment that (i) is different from the identified initial lane segment and (ii) was the initial lane segment for at least one of the path hypotheses generated at step 306.

FIGS. 4A-4F show the generation of a positive training example for an agent 402 that is navigating on a roadway that has two lanes 404 and 406 along the direction of travel of the agent 402.

Figure 4A:
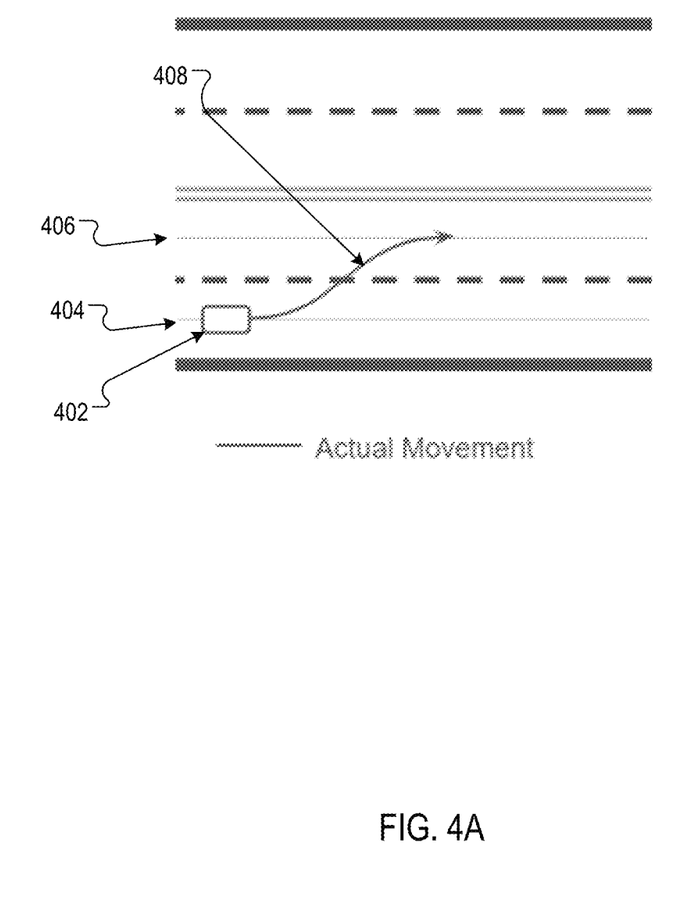
FIGS. 4A-F show the generation of a positive training example.

As shown in FIG. 4A, the agent 402 is initially located in lane 404 and the actual movement, i.e., the ground truth future trajectory 408, of the agent 402 is a lane change from lane 404 to lane 406.

Figure 4B:
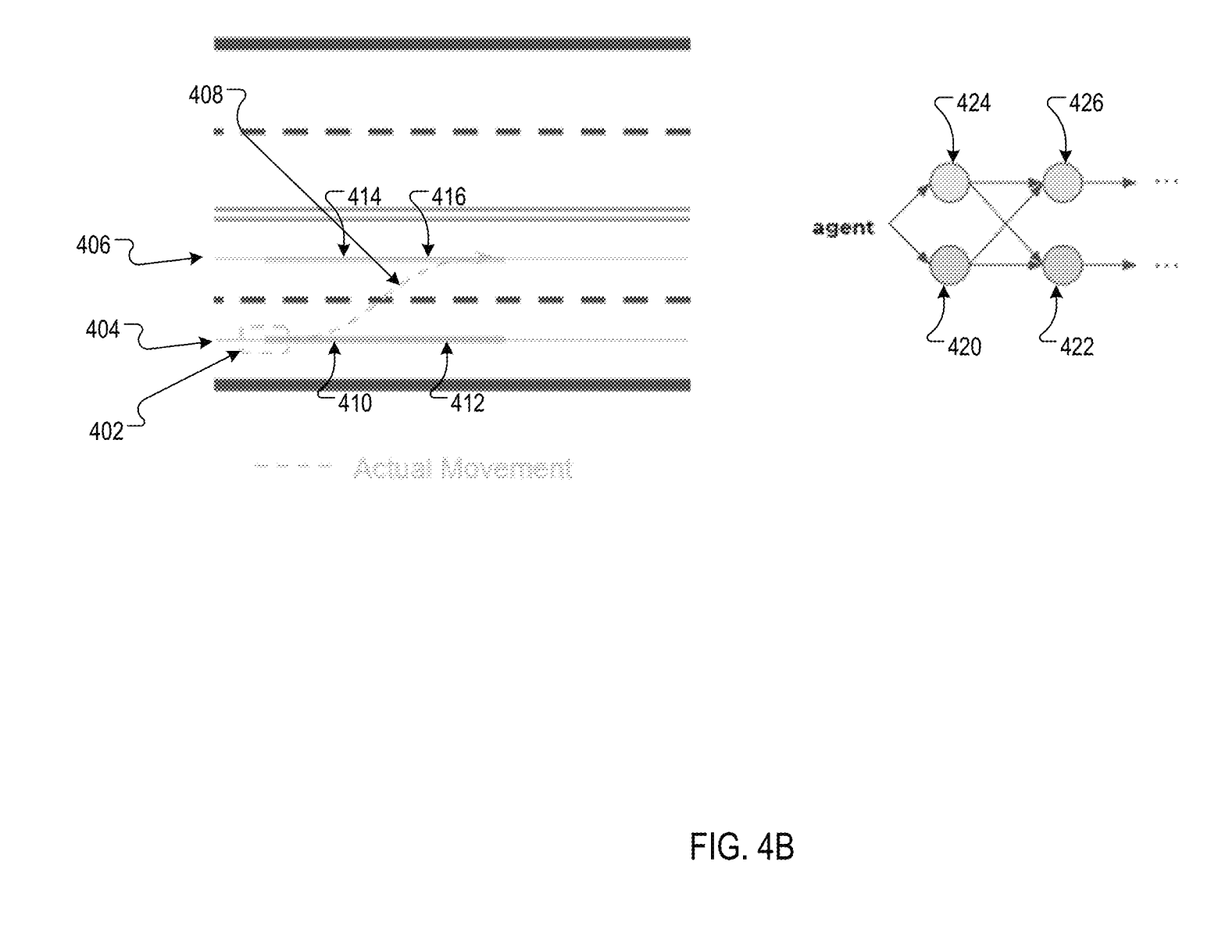

As shown in FIG. 4B, there are four nearby lane segments 410, 412, 414, and 416 that could be followed by the agent 402 starting from the initial position of the agent. These lane segments can be represented as a directed graph where each node 420, 422, 424, and 426 in the graph corresponds to one of the lane segments 410, 412, 414, and 416 and the edges in the graph represent transitions by the agent from one lane segment to another.

Figure 4C:
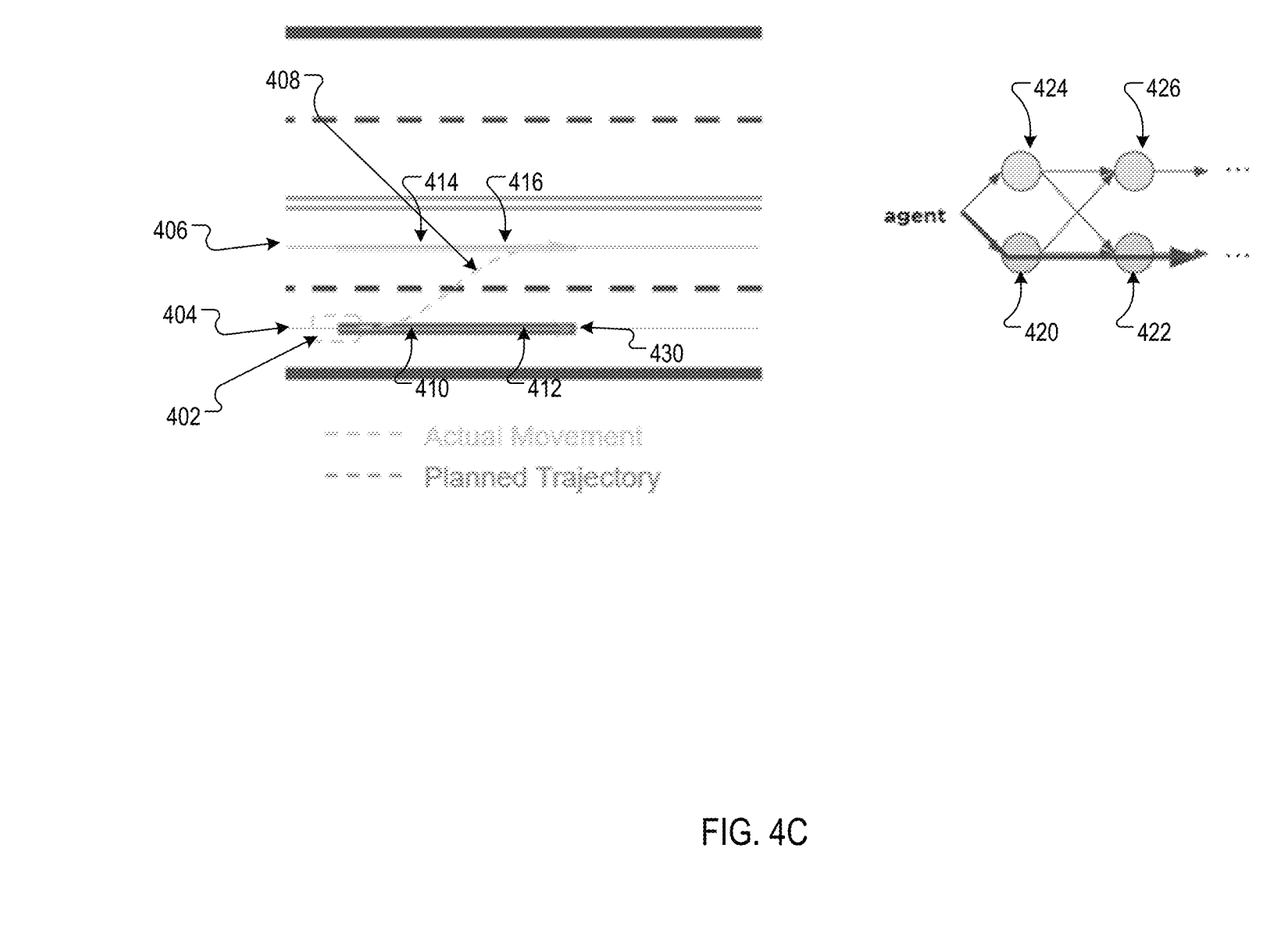

As shown in FIG. 4C, one example path hypothesis involves the agent remaining in the lane 404 and therefore traversing from lane segment 410 to lane segment 412 or, as shown in the graph, from node 420 to node 422. The corresponding planned future trajectory 430 for this path hypothesis is shown as a straight line through the middle of lane 404.

Figure 4D:
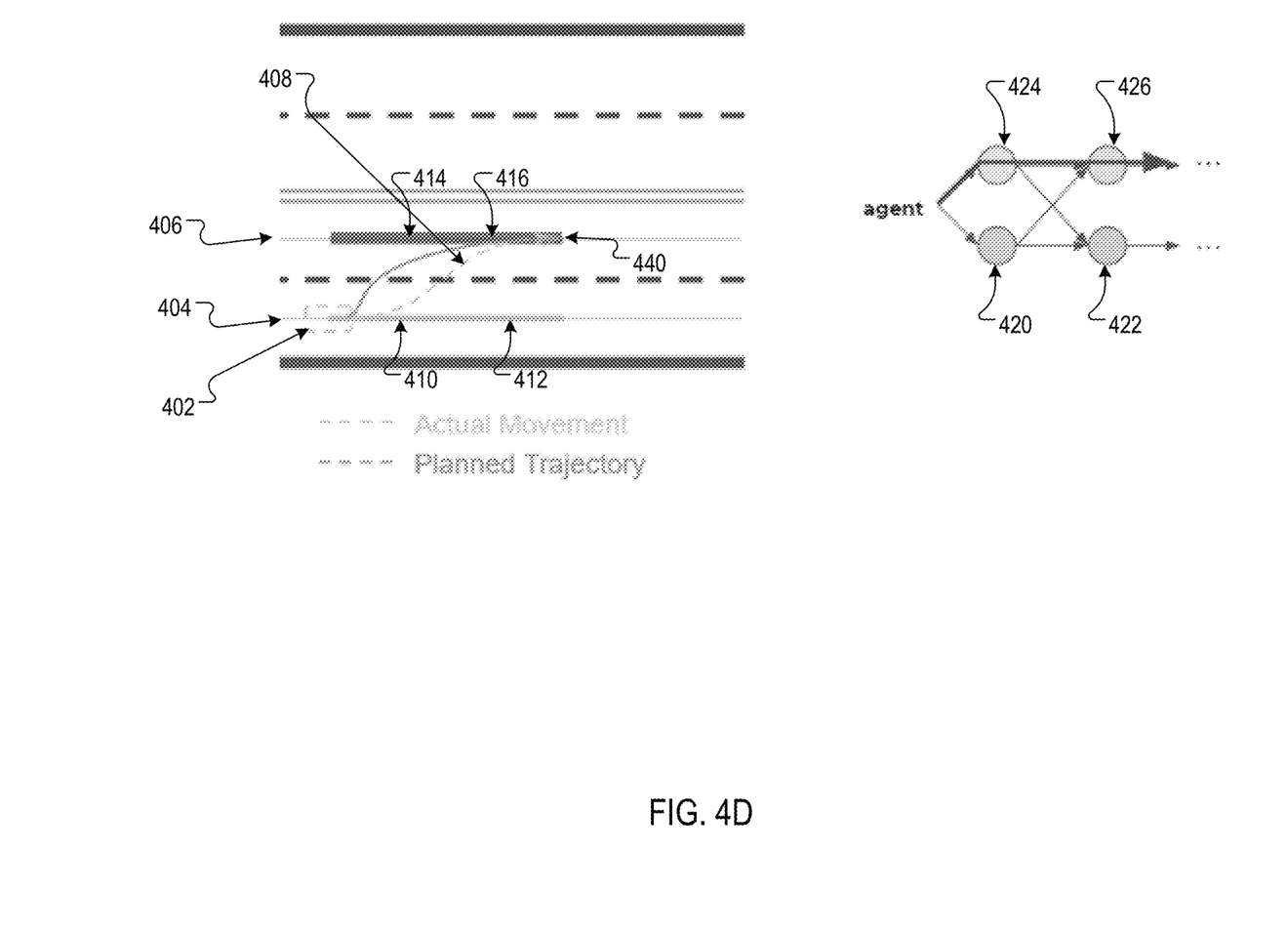

As shown in FIG. 4D, another example path hypothesis involves the agent immediately moving to lane 406 and then remaining in the lane 406 and therefore traversing from lane segment 414 to lane segment 416 or, as shown in the graph, from node 424 to node 426. The corresponding planned future trajectory 440 for this path hypothesis is shown as a curved line from the middle of lane 404 to the middle of lane 406, i.e., that represents the actual motion of an agent that intends to follow the path hypothesis.

Figure 4E:
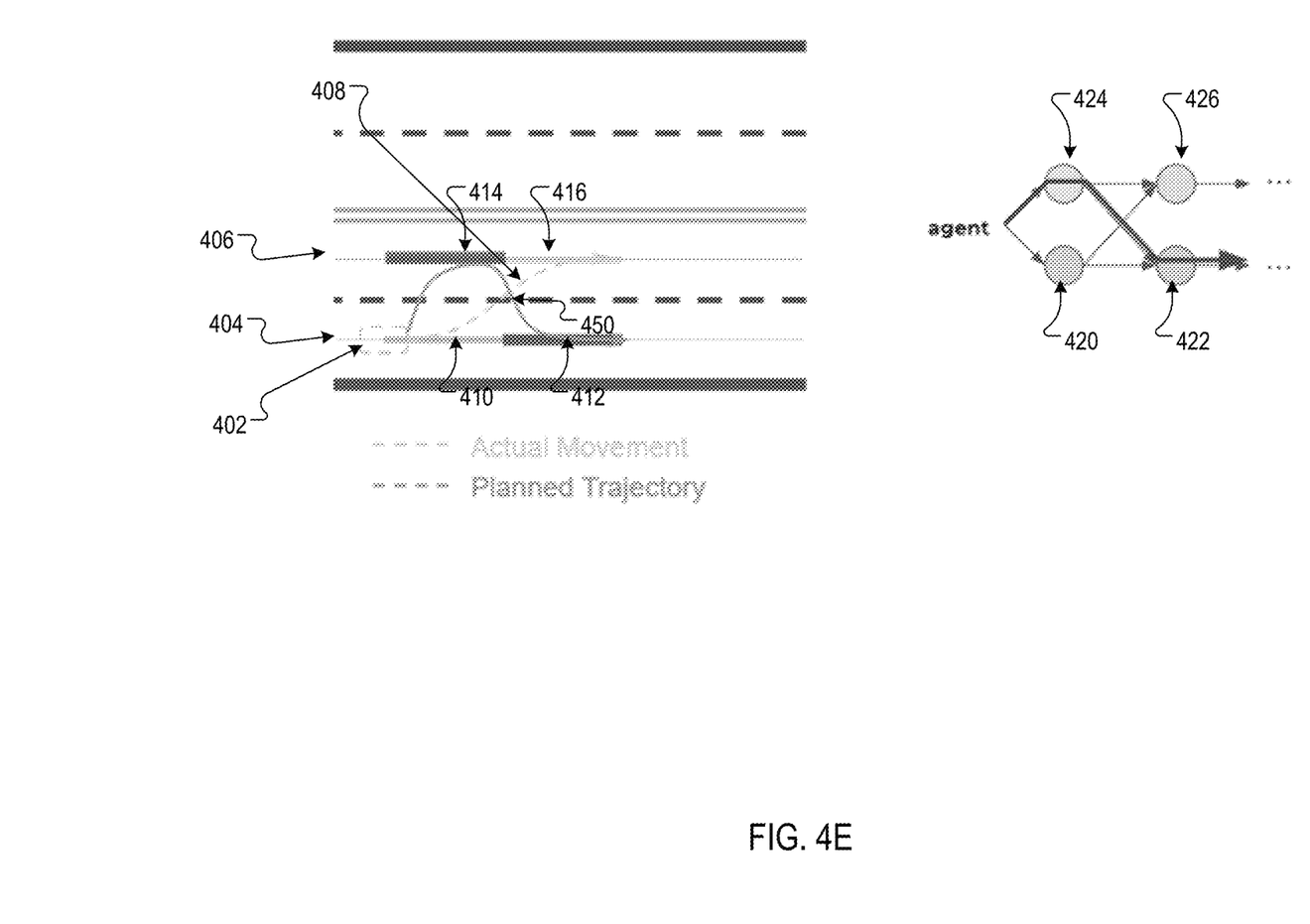

As shown in FIG. 4E, yet another example path hypothesis involves the agent immediately moving to lane 406 and then transitioning back to lane 404 and therefore traversing from lane segment 414 to lane segment 412 or, as shown in the graph, from node 424 to node 422. The corresponding planned future trajectory 450 for this path hypothesis is shown as a curved line from the middle of lane 404 to the middle of lane 406 and then another curved line from the middle of lane 406 to the middle of lane 404.

Figure 4F:
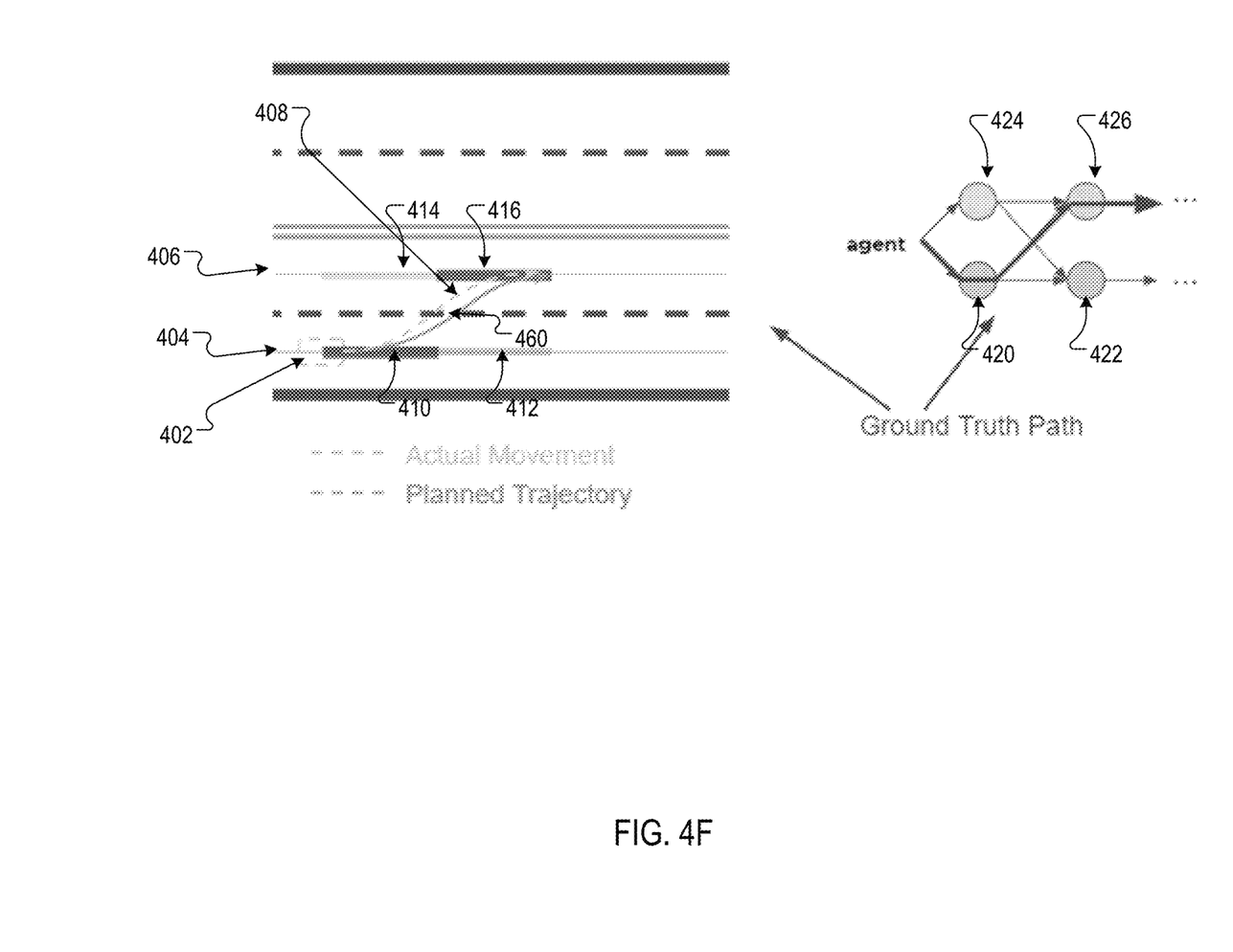

As shown in FIG. 4F, yet another example path hypothesis first continuing along lane 404 and then moving to lane 406 and therefore traversing from lane segment 410 to lane segment 414 or, as shown in the graph, from node 420 to node 424. The corresponding planned future trajectory 460 for this path hypothesis is shown as a slightly curved line from the middle of lane 404 to the middle of lane 406.

As described above, assuming that the trajectories 430, 440, 450, and 460 are the set of candidate future trajectories, the system determines that the trajectory 460 is the most similar to the ground truth trajectory and therefore determines that the path hypothesis that traverses from lane segment 410 to lane segment 416 is the ground truth path hypothesis. Therefore, the system can identify, as a positive training example, a training example that includes a model input that includes features of the lane segment 410 and can identify, as a negative training example, the training example that includes a model input that includes features of the lane segment 414.

While the above description describes labeling the initial lane segments in a path hypothesis, the described techniques can be used to label an entire sequence of lane segments, i.e., by labeling one entire path hypothesis as positive while labeling every other path hypothesis as negative. In the example of FIGS. 4A-F, there are 4 possible sequences/combinations: [410, 412], –[410, 416], [414, 416], and [414, 412]. Using the described techniques, the system can label the sequence [410, 416] as positive and the rest as negatives.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining scene data characterizing a scene in an environment at a current time point, wherein the scene data includes features characterizing a target agent in the environment and respective features of a plurality of lane segments of one or more lanes on one or more roadways in the environment;
    for each of the plurality of lane segments, processing a model input comprising (i) features of the lane segment and (ii) features of the target agent using a machine learning model to generate a respective score for the lane segment that represents a likelihood that the lane segment will be an immediate next lane segment that the target agent transitions to from a current lane segment that the target agent is traversing at the current time point;
    selecting, as a set of seed lane segments, a proper subset of the plurality of lane segments based on the respective scores; and
    generating, using the set of seed lane segments, a plurality of candidate future trajectories for the target agent.

2. The method of claim 1, wherein generating, using the proper subset of the plurality of lane segments, a plurality of candidate future trajectories for the target agent comprises:
    generating, for each lane segment in the set of seed lane segments, one or more path hypotheses that each include a sequence of lane segments that begins with the seed lane segment; and
    generating a respective candidate future trajectory for each of the path hypotheses.

3. The method of claim 2, wherein each candidate future trajectory specifies, for each multiple future time points that are after the current time point, a geometry of the target agent at the future time point and a velocity of the target agent at the future time point.

4. The method of claim 2, wherein generating a respective candidate future trajectory for each of the path hypotheses comprises:
    generating the respective candidate future trajectory from the path hypothesis using a motion planning algorithm.

5. The method of claim 1, wherein the target agent is an agent in a vicinity of an autonomous vehicle in the environment, and wherein the method further comprising:
    providing the candidate future trajectories to a behavior prediction system of the autonomous vehicle, wherein the behavior prediction system is configured to assign a respective score to each of the candidate future trajectories that characterizes a respective likelihood that the candidate future trajectory will be an actual future trajectory of the target agent after the current time point.

6. A method of training a machine learning model that is configured to process a model input comprising (i) features of an input lane segment and (ii) features of an input agent at a current time point to generate a score for the input lane segment that represents a likelihood that the lane segment will be a first lane segment traversed by the input agent after the current time point, the method comprising:
    generating training data for training the machine learning model, comprising:
        receiving data identifying a ground truth trajectory of a first agent after a first time point;
        identifying a plurality of candidate lane segments that are in a vicinity of the first agent at the first time point;
        generating, for each of the candidate lane segments, one or more candidate future trajectories for the first agent after the first point;
        determining a respective similarity measure between the ground truth trajectory and each of the candidate future trajectories;
        identifying, from the candidate future trajectories, a candidate future trajectory that is most similar to the ground truth trajectory according to the respective similarity measures; and
        identifying, as a positive training example, a training example that includes (i) features of the candidate lane segment corresponding to the identified future trajectory and (ii) features of the first agent at the first time point.

7. The method of claim 6, further comprising, for a first candidate lane segment that is different from the candidate lane segment corresponding to the identified candidate future trajectory:
    identifying, as a negative training example, a training example that includes (i) features of the first candidate lane segment and (ii) features of the first agent at the first time point.

8. The method of claim 6, wherein generating, for each of the candidate lane segments, one or more candidate future trajectories for the first agent after the first point comprises:
    generating, for each lane segment in the plurality of candidate lane segments, one or more path hypotheses that each include a sequence of lane segments that begins with the candidate lane segment; and
    generating a respective candidate future trajectory for each of the path hypotheses.

9. A system comprising one or more computers and one or more storage devices storing instructions that when executed by the one or more computers cause the one or more computers to perform operations comprising:
    obtaining scene data characterizing a scene in an environment at a current time point, wherein the scene data includes features characterizing a target agent in the environment and respective features of a plurality of lane segments of one or more lanes on one or more roadways in the environment;
    for each of the plurality of lane segments, processing a model input comprising (i) features of the lane segment and (ii) features of the target agent using a machine learning model to generate a respective score for the lane segment that represents a likelihood that the lane segment will be an immediate next lane segment that the target agent transitions to from a current lane segment that the target agent is traversing at the current time point;
    selecting, as a set of seed lane segments, a proper subset of the plurality of lane segments based on the respective scores; and generating, using the set of seed lane segments, a plurality of candidate future trajectories for the target agent.

10. The system of claim 9, wherein generating, using the proper subset of the plurality of lane segments, a plurality of candidate future trajectories for the target agent comprises:
   generating, for each lane segment in the set of seed lane segments, one or more path hypotheses that each include a sequence of lane segments that begins with the seed lane segment; and
   generating a respective candidate future trajectory for each of the path hypotheses.

11. The system of claim 10, wherein each candidate future trajectory specifies, for each multiple future time points that are after the current time point, a geometry of the target agent at the future time point and a velocity of the target agent at the future time point.

12. The system of claim 10, wherein generating a respective candidate future trajectory for each of the path hypotheses comprises:
   generating the respective candidate future trajectory from the path hypothesis using a motion planning algorithm.

13. The system of claim 10, wherein the target agent is an agent in a vicinity of an autonomous vehicle in the environment, and wherein the operations further comprising:
   providing the candidate future trajectories to a behavior prediction system of the autonomous vehicle, wherein the behavior prediction system is configured to assign a respective score to each of the candidate future trajectories that characterizes a respective likelihood that the candidate future trajectory will be an actual future trajectory of the target agent after the current time point.

14. A system for training a machine learning model that is configured to process a model input comprising (i) features of an input lane segment and (ii) features of an input agent at a current time point to generate a score for the input lane segment that represents a likelihood that the lane segment will be a first lane segment traversed by the input agent after the current time point, the system comprising one or more computers and one or more storage devices storing instructions that when executed by the one or more computers cause the one or more computers to perform operations comprising:
   generating training data for training the machine learning model, comprising:
      receiving data identifying a ground truth trajectory of a first agent after a first time point;
      identifying a plurality of candidate lane segments that are in a vicinity of the first agent at the first time point;
      generating, for each of the candidate lane segments, one or more candidate future trajectories for the first agent after the first point;
      determining a respective similarity measure between the ground truth trajectory and each of the candidate future trajectories;
      identifying, from the candidate future trajectories, a candidate future trajectory that is most similar to the ground truth trajectory according to the respective similarity measures; and
      identifying, as a positive training example, a training example that includes (i) features of the candidate lane segment corresponding to the identified future trajectory and (ii) features of the first agent at the first time point.

15. The system of claim 14, the operations further comprising, for a first candidate lane segment that is different from the candidate lane segment corresponding to the identified candidate future trajectory:
   identifying, as a negative training example, a training example that includes (i) features of the first candidate lane segment and (ii) features of the first agent at the first time point.

16. The system of claim 14, wherein generating, for each of the candidate lane segments, one or more candidate future trajectories for the first agent after the first point comprises:
   generating, for each lane segment in the plurality of candidate lane segments, one or more path hypotheses that each include a sequence of lane segments that begins with the candidate lane segment; and
   generating a respective candidate future trajectory for each of the path hypotheses.

\* \* \* \* \*